July 15, 1924.
H. H. CUTLER
1,501,041
INTERNAL COMBUSTION ENGINE
Filed Jan. 25, 1922
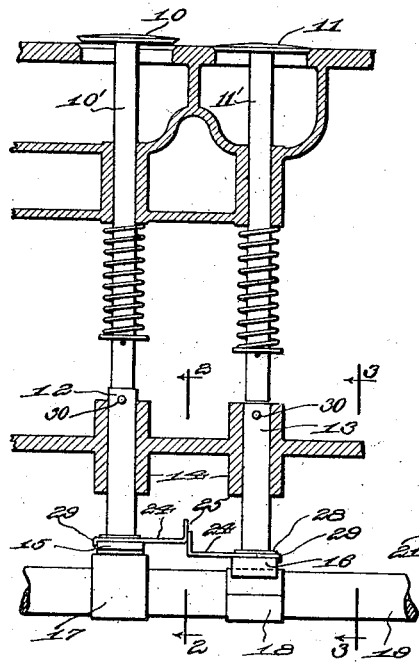
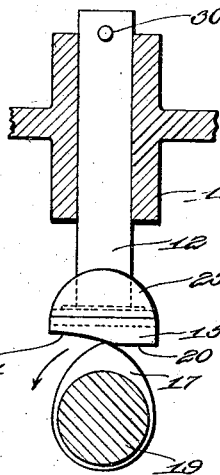
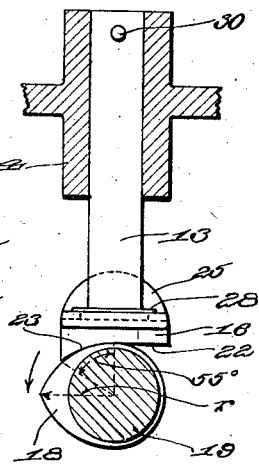
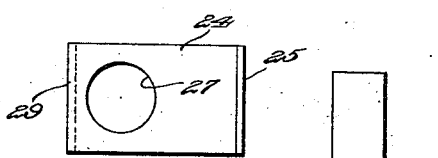
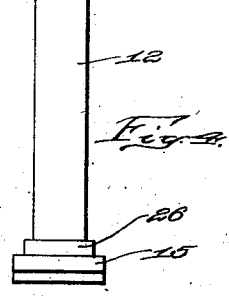
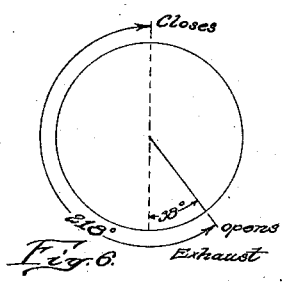
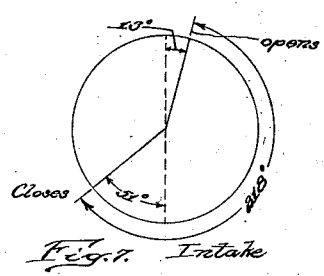
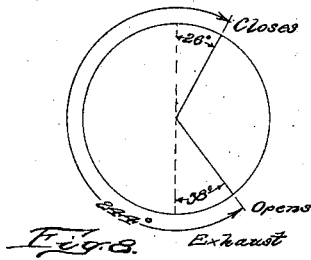
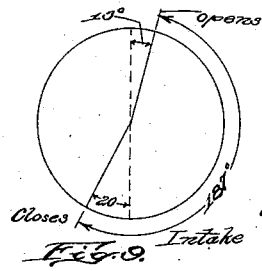
Inventor:
Henry H. Cutler
By Geo. K. Woodworth
Atty.

Patented July 15, 1924.

1,501,041

UNITED STATES PATENT OFFICE.

HENRY H. CUTLER, OF BROOKLINE, MASSACHUSETTS.

INTERNAL-COMBUSTION ENGINE.

Application filed January 25, 1922. Serial No. 531,629.

*To all whom it may concern:*

Be it known that I, HENRY H. CUTLER, a citizen of the United States, and a resident of Brookline, in the county of Norfolk and State of Massachusetts, have invented a new and useful Improvement in Internal-Combustion Engines, of which the following is a specification.

My invention relates to internal combustion engines and more particularly to mechanism for controlling the valves thereof.

The principal object of my invention is to provide valve push-rods or tappets which may readily be substituted for the push rods or tappets of a Ford engine for co-operation with the cam shaft and valve stems thereof without changing the adjustment of either of those elements whereby the power developed by such engine from a given quantity of fuel may be increased.

Another object of my invention is to provide push rods, the lower ends of which are provided with cam plates instead of the usual flat discs, said cam plates being so constructed that the exhaust valve will open at the same point in the cycle as the exhaust valve of a Ford engine, will remain open to its full extent during a substantial portion of the crank shaft rotation, and will close at a point beyond upper dead center of the crank, the Ford exhaust valve closing at upper dead center; and the intake valve will open at the same point in the cycle as the Ford intake valve, but before the closure of the exhaust valve, and will close at a point approximately one-twelfth of a revolution before the point of closure of the Ford intake valve.

A further object of my invention is to provide means secured to said push rods to prevent the same from turning in their guides so as to ensure proper co-operation between the cams on the cam shaft and the cam plates on said push rods.

As is well understood the Ford exhaust valve is arranged to open approximately 38 degrees before lower dead center and is closed at about upper dead center, remaining open substantially 218 degrees, and also that it is open to its full extent only momentarily, its movement being governed by a cam co-operating with a plane-surfaced push-rod disc, which results in an incomplete exhaust; and also that the intake valve is arranged to open about 13 degrees after the closure of the exhaust valve, that is to say, about 13 degrees beyond upper dead center, and to close about 51 degrees beyond lower dead center, remaining open practically 218 degrees, which results in the rising piston expelling a portion of the fresh charge.

When the exhaust valve is closed at upper dead center a certain amount of burned gases is trapped in the cylinder, and when, 13 degrees thereafter, the intake valve is opened, the burned gases so trapped in the cylinder which are under a certain amount of pressure and have a temperature relatively high compared to that of the fresh charge, will have the effect of retarding the admission of the fresh charge as well as diluting the same.

I have ascertained practically that if the exhaust valve remain open after upper dead center is reached, for example, approximately 26 degrees beyond upper dead center and about 13 degrees beyond the point at which the intake valve begins to open, the quantity of burned gas which is trapped in the cylinder is materially reduced, the momentum of said burned gas effecting a more complete expulsion of the same that when the exhaust valve closes at upper dead center notwithstanding the fact that between upper dead center and the point of closure of the exhaust valve the piston moves slightly downwardly. Furthermore the momentum of the exhaust gases creates a slight vacuum in the cylinder which facilitates the admission of a fresh charge through the intake valve which, as aforesaid, begins to open about 13 degrees before the point of complete closure of the exhaust valve.

By closing the intake valve about 20 degrees beyond lower dead center or about 31 degrees before the point of closure of the intake valve of the Ford engine, I prevent the expulsion of a portion of the fresh charge by the rising piston and gain about 31 degrees on the compression stroke.

It is to be understood of course that I do not limit myself to the specific dimensions above set forth which have been determined by practice, and that the same are merely illustrative of one practical embodiment of my invention.

With the foregoing objects in view my invention comprises essentially a means for maintaining an exhaust valve open to its full extent during a substantial portion of the crank-shaft rotation and then quickly closing the same, such, for example, as a push rod having a cam plate on the lower end thereof, said cam plate preferably being designed to maintain said exhaust valve open from a point before lower dead center to a point beyond upper dead center, thereby to ensure a more complete exhaust; means for opening the intake valve at a point prior to the closure of the exhaust valve and for closing the same at a point before that at which the intake valve usually closes, such, for example, as a push rod having a cam plate on the lower end thereof, thereby to prevent the expulsion of a portion of the fresh charge and to lengthen the compression stroke; and means, such as plates attached respectively, to said push rods and provided with co-operating end flanges, for preventing said push rods from turning in their guides, so as to ensure the proper co-operation between the cams on the cam shaft and the cam plates on said push rod.

An illustrative embodiment of my invention is shown in the accompanying drawings in which,—

Figure 1 is a vertical section of the valves and operating mechanism embodying my invention, the several parts being shown in the position which they occupy on the intake stroke;

Fig. 2 is a section on an enlarged scale taken on the line 2—2 of Figure 1;

Fig. 3 is a section on an enlarged scale taken on the line 3—3 of Figure 1;

Fig. 4 is an elevation of the push rod which co-operates with the stem of the intake valve before the plate which prevents said rod from turning in its guide has been affixed thereto;

Fig. 5 is a plan view of the plate which is attached to the upper surface of the cam plate of each push rod to prevent the turning of the latter in their guides;

Figs. 6, 7, 8, and 9 are diagrams hereinafter referred to in explaining the operation of my invention.

In the particular drawings selected for more fully disclosing my invention, 10, 11 are the intake and exhaust valves respectively of an internal combustion engine affixed to the stems 10', 11' with which the push rods or tappets 12, 13 cooperate.

The push rods are arranged in the guides 14 and are provided at their ends with cam plates 15, 16 instead of the usual flat discs, with which the cams 17, 18 on the cam shaft 19 co-act.

The cam plate on the lower end of the intake valves consists of a plane surface 20 intersecting an upwardly inclined surface, shown in the present instance as the arcuate surface 21 lying above the plane of said plane surface, so that, as will be obvious, when the rise of the cam 17 passes said plane surface and comes into contact with said arcuate surface, the push rod will fall more rapidly than if its lower end were provided with a plane or flat disc.

The cam plate 16 on the lower end of the push rod 13 consists of a plane surface 22 tangential to a downwardly inclined surface herein shown as the arcuate surface 23 which preferably has the same radius of curvature $r$ as the rise of the cam 18.

It will be apparent that when the rise of said cam arrives at the line of tangency of the surface 22 with the surface 23, the push rod 13 will have reached its maximum elevation, and that it will remain stationary until the rise of the cam passes the end of the arcuate surface 23, whereupon the push rod will begin to fall. As indicated in Fig. 3 the push rod 13 will remain at its point of maximum elevation for about 55 degrees of cam shaft rotation or about 110 degrees of crank shaft rotation.

Figs. 6 and 7 represent the points in the cycle at which the exhaust and intake valves of a Ford engine open and close, and Figures 8 and 9 show the points of opening and closing of the exhaust and intake valves of said engine when the push rods are provided with the cam plates above described.

Comparing Figs. 6 and 8 it will be noted that my exhaust valve opens at the same point in the cycle as the Ford exhaust valve and that it remains open 26 degrees after the closure of the Ford exhaust valve, this being effected by the shape of the cam plate 16.

Comparing Figs. 7 and 9 it will be noted that my intake valve opens at the same point as the Ford intake valve and that it closes approximately 31 degrees before the point of closure of the latter, this resulting from the arcuate surface 21 shown in Fig. 2.

By virtue of the cam plate 16 my exhaust valve remains open to its full extent during a substantial portion viz, about 110 degrees, of crank shaft rotation and then quickly closes, so that a much larger proportion of the burned gases is expelled from the cylinder than if the exhaust valve was opened to its full extent only momentarily, as in the case of a Ford engine, and was closed at upper dead center.

By virtue of the cam plate 15 which effects the closure of the intake valve about 20 degrees beyond lower dead center or about 31 degrees before the point of closure of the Ford intake valve, I prevent the expulsion of a portion of the fresh charge by the rising piston and at the same time gain about 31 degrees on the compression stroke, The shape of the cam plates have been worked out in practice, and I have ascertained practically that when the valves are actuated in the manner above set forth, the mileage of a Ford machine for a given quantity of fuel is materially increased, but it is to be understood that I do not limit myself to the particular shape of the cam surfaces shown in the drawings or to the particular timing of the valves indicated in Figs. 8 and 9.

In order to prevent the push rods from turning in their guides, I employ, as shown in the present instance, oppositely directed plates 24 secured to the upper faces of the cam plates, respectively, and having their inner ends terminating in contiguous flanges 25. A convenient mode of securing said plates consists in heading the shoulder 26 which rises from the upper surface of the cam plate and projects through the hole 27 in the plate 24 down over said plate as indicated at 28, although it will be understood that any other suitable means may be employed for attaching the guide plates 24 to the push rods. The outer end of each guide plate preferably terminates in a flange 29 bent down against one side of the cam plate.

While my improved push rods or tappets have been designed with especial reference to the Ford machine, it will be understood that I do not limit myself in this respect and that the principle herein disclosed is capable of general application.

In order to apply my improved tappets to a Ford engine, the cam shaft is removed, whereupon the tappets drop out of their guides and my tappets are then inserted, one by one, in said guides, a pin being pushed through the hole 30 bored in the upper end of each push rod to retain the latter in position until the cam shaft is replaced, whereupon said pins are withdrawn. It will be noted that the cam surfaces 15, 16 are so designed that my improved tappets may be substituted for the tappets of a Ford machine without any change in the adjustment of the valve stems or the cam shaft.

Having described my invention, what I claim as new and desire to secure by Letters Patent is:

1. An internal combustion engine comprising in combination, a cylinder, a power piston in said cylinder, a valve for said cylinder, a spring for closing said valve, a cam-shaft, a cam on said cam-shaft, a connection between said cam and valve for opening said valve against the action of said spring, and a cam-follower rigidly attached to said connection and co-operating with said cam on said cam-shaft, that portion of the contacting surface of the cam-follower with which the high point of the cam contacts while receding being concavely curved towards said cam and the center line of said cam-shaft intersecting the center line of said cam-follower.

2. An internal combustion engine comprising in combination, a cylinder, a power piston in said cylinder, a valve for said cylinder, a spring for closing said valve, a cam-shaft, a cam on said cam-shaft, a connection between said cam and valve for opening said valve against the action of said spring, and a cam-follower rigidly attached to said connection and co-operating with said cam on said cam-shaft, that portion of the contacting surface of the cam-follower with which the high point of the cam contacts while receding being concavely curved towards said cam with a radius of curvature corresponding to the maximum radius of said cam and the center line of said cam-shaft intersecting the center line of said cam-follower.

3. A push-rod for the valve stem of an internal-combustion-engine exhaust-valve having a cam-follower on the lower end thereof, said cam-follower having a plane surface tangential to a downwardly-concaved arcuate surface.

4. A push-rod for the valve stem of an internal-combustion-engine exhaust-valve having a cam-follower on the lower end thereof, said cam-follower having a plane surface tangential to a downwardly-concaved arcuate surface said arcuate surface having a radius of curvature equal to the radius of the rise of the co-operating cam-shaft cam.

5. A push-rod for the valve stem of an internal-combustion-engine intake-valve having a cam-follower on the lower end thereof, a cam-shaft, and a cam on said cam-shaft co-operating with said cam-follower, said cam-follower having a plane surface intersecting an arcuate surface and said arcuate surface lying above the plane of said plane surface, and the center line of said cam-shaft intersecting the center line of said cam-follower.

6. A push-rod for the valve stem of an internal-combustion-engine exhaust-valve having a cam-follower on the lower end thereof, and a cam co-operating with said cam-follower, that portion of the contacting surface of said cam-follower with which the toe of said cam contacts while receding being inclined downwardly.

7. A push-rod for the valve stem of an internal-combustion-engine intake-valve having a cam-follower on the lower end thereof, a cam-shaft, and a cam on said cam-shaft co-operating with said cam-follower, that portion of the contacting surface of said cam-follower with which the toe of said cam contacts while receding being inclined upwardly, and the center line of said cam-shaft intersecting the center line of said cam-follower.

8. An internal-combustion-engine comprising in combination, an exhaust-valve stem having a cam-follower on the lower end thereof, a cam-shaft, a cam on said cam-shaft co-operating with said cam-follower, that portion of the contacting surface of said cam-follower with which the toe of said cam contacts while receding being inclined downwardly, an intake-valve stem having a cam-follower on the lower end thereof, and a cam on said cam-shaft co-operating with the last-mentioned cam-follower, that portion of the contacting surface of the last-mentioned cam-follower with which the toe of said cam contacts while receding being inclined upwardly.

9. An internal-combustion-engine comprising in combination, an exhaust valve and an intake valve, stems for said valves, cam-followers on the lower ends of said stems, respectively, the cam-follower on the exhaust-valve stem having a plane surface tangential to an arcuate surface, and the cam-follower on the intake-valve stem having a plane surface intersecting an arcuate surface, the last-mentioned arcuate surface lying above the plane of said plane surface, a cam-shaft and cams on said cam-shaft co-operating respectively with said cam-followers.

In testimony whereof, I have hereunto subscribed my name this 20th day of January 1922.

HENRY H. CUTLER